United States Patent
Duvaut et al.

(10) Patent No.: US 7,142,595 B1
(45) Date of Patent: Nov. 28, 2006

(54) SYSTEM AND METHOD FOR DECREASING CROSS-TALK EFFECTS IN TIME-DOMAIN-MODULATION (TDM) DIGITAL SUBSCRIBER LINE (DSL) SYSTEMS

(75) Inventors: Patrick Duvaut, Eatontown, NJ (US); William Keasler, Tinton Falls, NJ (US); Oliver Moreno, Eatontown, NJ (US)

(73) Assignee: Conexant, Inc., Red Bank, NJ (US)

( * ) Notice: Subject to any disclaimer, the term of this patent is extended or adjusted under 35 U.S.C. 154(b) by 1101 days.

(21) Appl. No.: 10/120,941

(22) Filed: Apr. 10, 2002

Related U.S. Application Data (60) Provisional application No. 60/283,465, filed on Apr. 12, 2001.

(51) Int. Cl.
*H03K 5/159* (2006.01)

(52) U.S. Cl. .................. 375/232; 375/350; 375/233; 375/285

(58) Field of Classification Search ................ 375/296, 375/340, 265, 144, 336, 233, 222, 232, 350
See application file for complete search history.

(56) References Cited

U.S. PATENT DOCUMENTS

| | | | | |
|---|---|---|---|---|
| 5,214,675 A * | 5/1993 | Mueller et al. | ............. | 375/340 |
| 5,881,108 A * | 3/1999 | Herzberg et al. | ........... | 375/296 |
| 6,411,661 B1 * | 6/2002 | Nguyen et al. | ............. | 375/336 |
| 6,891,897 B1 * | 5/2005 | Bevan et al. | ............... | 375/265 |
| 6,999,504 B1 * | 2/2006 | Amrany et al. | ............. | 375/222 |
| 7,010,030 B1 * | 3/2006 | Vaidyanathan | .............. | 375/233 |
| 2002/0150059 A1 * | 10/2002 | Blake | ........................ | 370/286 |
| 2003/0043887 A1 * | 3/2003 | Hudson | ...................... | 375/144 |
| 2006/0039550 A1 * | 2/2006 | Chadha et al. | ......... | 379/406.09 |

\* cited by examiner

*Primary Examiner*—Tesfaldet Bocure
*Assistant Examiner*—Sudhanshu C. Pathak
(74) *Attorney, Agent, or Firm*—Thomas, Kayden, Horstemeyer & Risley (57) ABSTRACT

A communications system may be characterized by a system error variance because the error variance provides an indication of signal corruption in the system. By strategically adding a secondary sensor to the communications system, system characteristics may be altered so that the system error variance is reduced. A system and method are presented, wherein a secondary sensor is configured to receive a disturbance effect and produce a filtered slave signal as a function of the disturbance effect. The filtered slave signal is configured to alter the characteristics of the communications system and thereby reduce system error variance.

9 Claims, 8 Drawing Sheets

SYSTEM AND METHOD FOR DECREASING CROSS-TALK EFFECTS IN TIME-DOMAIN-MODULATION (TDM) DIGITAL SUBSCRIBER LINE (DSL) SYSTEMS

CROSS REFERENCE TO RELATED APPLICATIONS

This application claims the benefit of U.S. Provisional Patent Application No. 60/283,465, dated Apr. 12, 2001, which is incorporated herein by reference in its entirety.

FIELD OF INVENTION

This invention relates generally to communication systems, and more particularly to a system and method for decreasing cross-talk effects in time-domain modulation (TDM) digital subscriber line (DSL) systems.

BACKGROUND

Communication systems are configured to provide a pathway in which information may be transmitted from one site (i.e., a source site) to another site (i.e., a sink site). Typically, the information is conveyed in the form of signals that are transmitted through communication channels. In ideal systems, each transmitted piece of information from the source site is received at the sink site without any corruption. In other words, a signal received at the sink site is an exact replica of the transmitted signal from the source site.

Unfortunately, due to system characteristics, actual communications systems corrupt the transmitted signal so that the received signal is not an exact replica of the transmitted signal. The signal corruption may be represented using a system error variance after channel equalization, which reflects the degree of corruption that is introduced into a system. In view of the relationship between signal corruption and system error variance, a need exists in the art to reduce system error variance, thereby reducing signal corruption.

SUMMARY

The present invention provides a system and method for decreasing signal corruption in a communications system. In one embodiment, a secondary sensor is coupled to a communications system, which alters system characteristics, thereby reducing signal corruption.

In architecture, one embodiment of the system comprises a receiver that is characterized by a receiver error variance, which is proportional to a degree of signal corruption. A secondary sensor is coupled to the receiver, and the secondary sensor generates a filtered slave signal that is used to decrease the receiver error variance to produce a decreased system error variance.

In accordance with another embodiment of the present invention, a method is provided for reducing signal corruption in a communications system. The method can be broadly conceptualized as generating a filtered slave signal and decreasing a system variance using the filtered slave signal.

Other systems, methods, features, and advantages of the invention will be, or become, apparent to one with skill in the art upon examination of the following figures and detailed description. It is intended that all such additional systems, methods, features, and advantages be included within the scope of the invention, and be protected by the accompanying claims.

BRIEF DESCRIPTION OF THE DRAWINGS

The above and further features, advantages, and benefits of the present invention will be apparent upon consideration of the following detailed description, taken in conjunction with the accompanying drawings, in which like reference characters refer to like parts throughout.

DETAILED DESCRIPTION OF DRAWINGS

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

Figure 1:
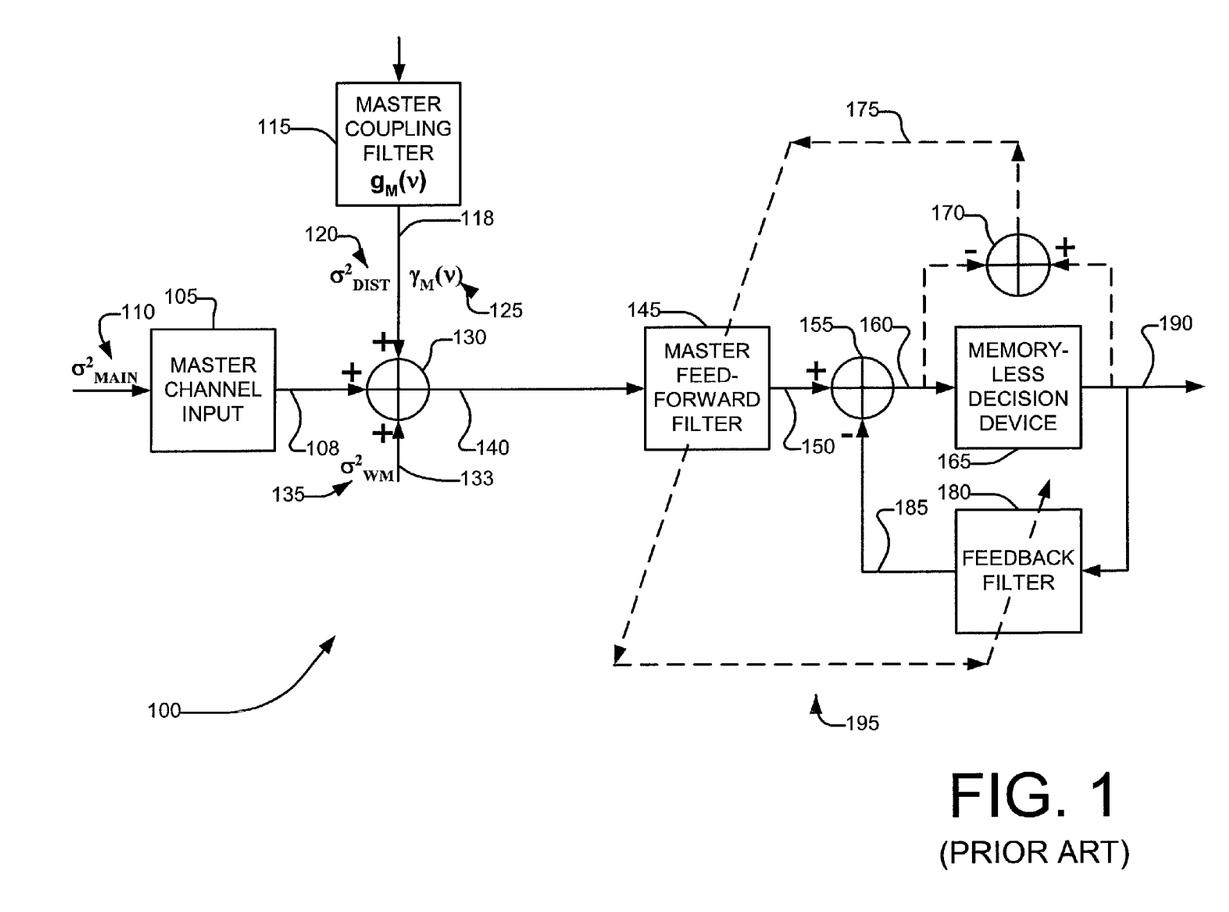
FIG. 1 is a block diagram showing a receiver system of the prior art.

FIG. 1 is a block diagram showing a receiver system 100 that is found in the prior art. The specific example of FIG. 1 shows the receiver 100 to be a classical minimum-mean-square error (MMSE) decision feedback equalizer (DFE). The receiver system 100 comprises a master channel input 105 that receives a main signal 108 having a variance 110 of $\sigma_{main}^2$. The receiver system 100 further comprises a master coupling filter 115 having a master coupling filter coefficient of $\tilde{g}_m(v)$. A disturbance signal 118 having a disturbance signal variance 120 of $\sigma_{dist}^2$ and a disturbance normalized spectral density 125 of $\tilde{\imath}_M(v)$ is received through the master coupling filter 115. In a digital subscriber line (DSL) environment, the disturbance signal 118 may be near-end cross-talk (NEXT). A master channel white noise 133 having a master channel white noise variance 135 of $\sigma_{WM}^2$ is added to the main signal 108 and the disturbance signal 118 at a master perturbation summing circuit 130 to produce a master-composite signal 140. The master-composite signal 140 is input to a feedback circuit 195 that recursively updates its feedback characteristics.

The feedback circuit 195 comprises a master feedforward filter 145, a feedback summing circuit 155, a memory-less decision device 165, a feedback filter 180, and a updating adder circuit 170 that feeds back a correction signal 175 to the master feedforward filter 145 and the feedback filter 180. The master feedforward filter 145 of the feedback circuit 195 initially receives the master-composite signal 140 and filters the master-composite signal 140 to produce a master filtered signal 150. The master filtered signal 150 is input to the feedback summing circuit 155, which uses the master filtered signal 150 to produce a feedback-compensated signal 160. The feedback-compensated signal 160 is input to both the memory-less decision device 165 and the updating adder circuit 170. The memory-less decision device 165 receives the feedback-compensated signal 160 and produces a decision output 190. The decision output 190 is fed back to both the feedback filter 180 and the updating adder circuit 170. The feedback filter 180 receives the decision output 190 and produces a feedback signal 185 as a function of the decision output 190. This feedback signal 185 is subtracted from the master filtered signal 150 by the feedback summing circuit 155. Thus, the feedback-compensated signal 160 is a function of both the feedback signal 185 and the master filtered signal 150. The updating adder circuit 170 receives the decision output 190 and produces a correction signal 175 by subtracting from the decision output 190 the earlier received feedback-compensated signal 160. It is this correction signal that is used to update the master feedforward filter 145 coefficient and the feedback filter 180 coefficient.

In the above-described system, the degree of signal corruption may be represented by an error variance after channel equalization. Thus, in the classical minimum-mean-square error (MMSE) decision feedback equalizer (DFE) (i.e., the receiver 100) of FIG. 1, the error variance may be represented by:

$$V = \sigma_{main}^2 \left( \exp\left\{ -\int_{[1]} \log(1 + SNR(v)) \, dv \right\} \right), \quad [\text{Eq. 1}]$$

wherein V represents the error variance, $\sigma_{main}^2$ represents the variance 110 of the main signal 108, $v$ represents the normalized frequency, and $SNR(v)$ represents the signal-to-noise ratio (SNR) of the DFE at the normalized frequency. The $SNR(v)$ may be further represented as:

$$SNR(v) = \frac{\sigma_{main}^2 |\tilde{h}(v)|^2}{\sigma_{WN}^2 + \sigma_{dist}^2 \tilde{\gamma}_M(v)}, \quad [\text{Eq. 2}]$$

wherein $\tilde{h}(v)$ represents the frequency gain of the system, $\sigma_{main}^2$ represents the variance 110 of the main signal 108, $\sigma_{WM}^2$ represents the master channel white noise variance 135, $\sigma_{dist}^2$ represents the disturbance signal variance 120 after the master coupling filter 115, and $\tilde{\gamma}_M(v)$ represents the normalized spectral density 125 of the disturbance signal 118 (e.g., near-end cross-talk (NEXT)). Additionally, since $\tilde{\gamma}_M(v)$ represents the normalized spectral density 125, this implies that:

$$\int_{[1]} \tilde{\gamma}_M(v) \, dv = 1. \quad [\text{Eq. 3}]$$

Due to the setup of classical MMSE-DFE, the SNR is a function of the disturbance signal 118 spectral density, which is represented by:

$$\sigma_{dist}^2 \tilde{\gamma}_M(v) \quad [\text{Eq. 4}].$$

By strategically adding a secondary sensor 200 (FIG. 2), 300 (FIG. 3), the disturbance signal 118 spectral density term may be altered to reduce the error variance of the system. Two non-limiting examples of this are shown in FIGS. 2 and 3, which are block diagrams showing a secondary sensor 200 (FIG. 2), 300 (FIG. 3) configured to reduce the error variance.

Figure 2:
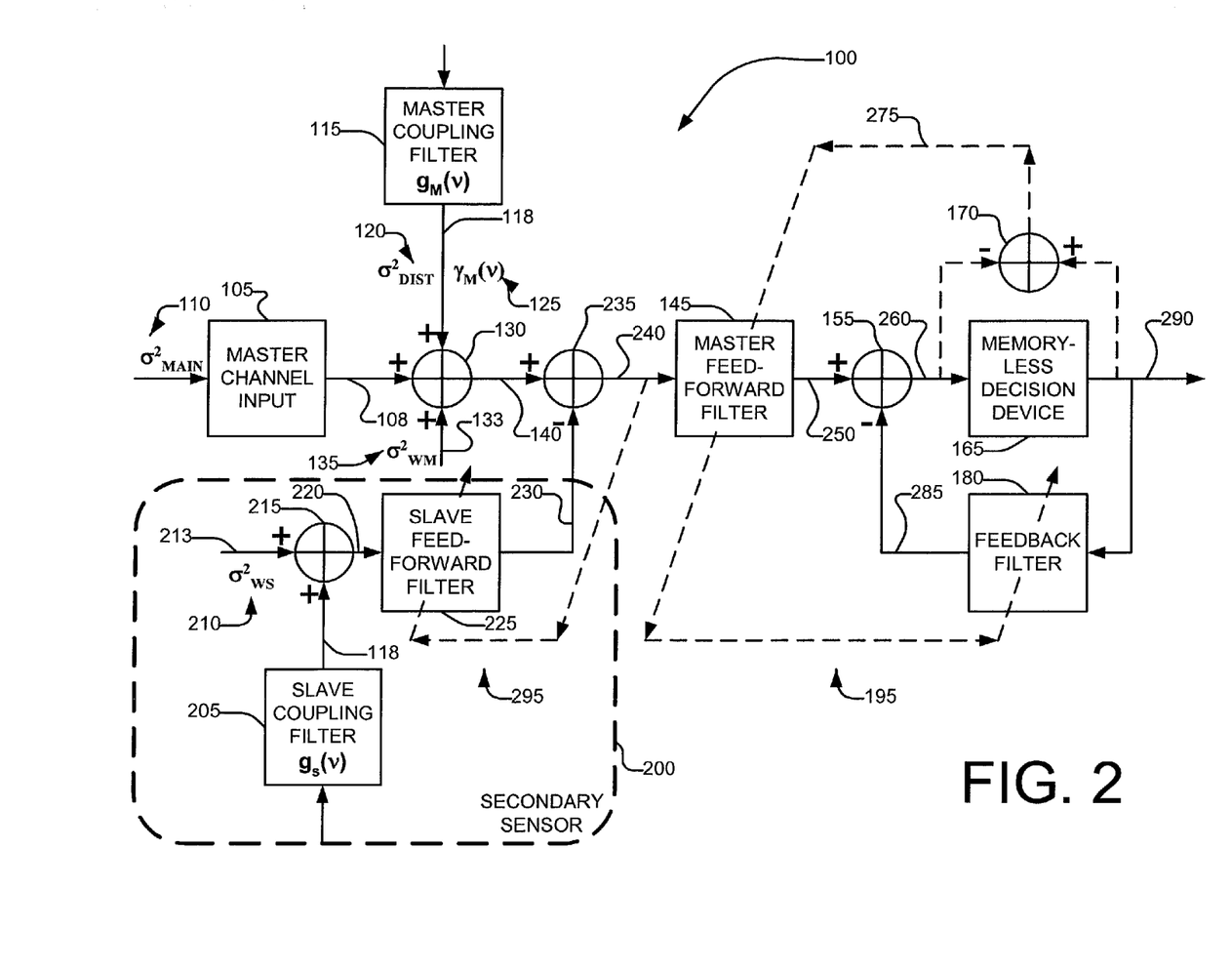
FIG. 2 is a block diagram showing one embodiment of the invention having a secondary sensor, wherein the secondary sensor has no portion of a main signal.
Figure 3:
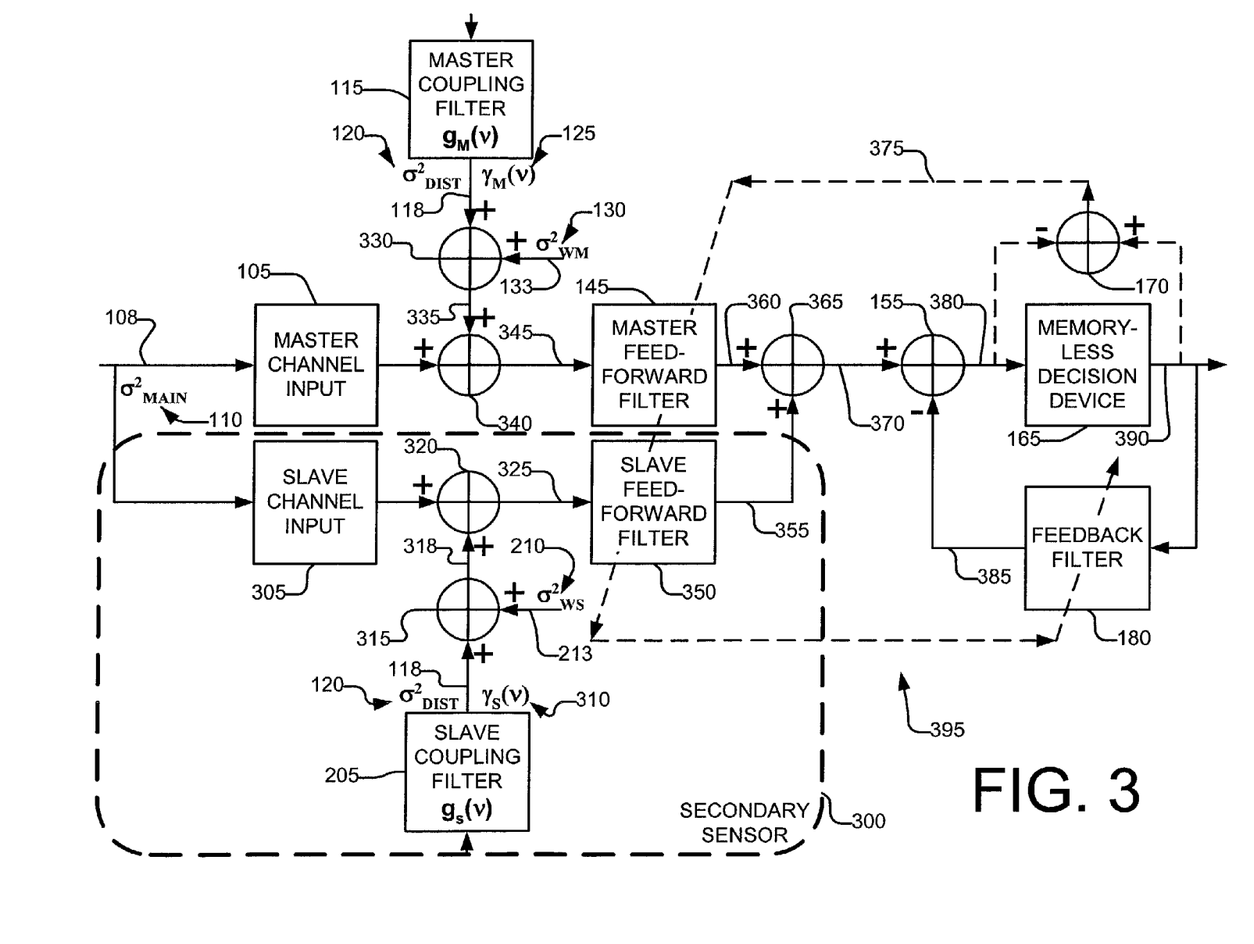
FIG. 3 is a block diagram showing another embodiment of the invention having a secondary sensor, wherein the secondary sensor has a portion of the main signal.

The system of FIG. 2 is configured so that there is no main signal 108 on the slave sensor 200. Thus, the system of FIG. 2 comprises a secondary sensor 200 that is coupled to the receiver 100 at a point after the generation of the master-composite signal 140 of FIG. 1. In the non-limiting embodiment of FIG. 2, a secondary sensor 200 is introduced between the master perturbation summing circuit 130 and the master feedforward filter 145 of the receiver system 100 of FIG. 1. Thus, the signal that is received by the master feedforward filter 145 is altered by the introduction of a slave signal 230 from the secondary sensor 200.

The secondary sensor comprises a slave-coupling filter 205 having a slave-coupling filter coefficient of $\tilde{s}_s(v)$ and a slave feedforward filter 225. The disturbance signal 118 is received by the secondary sensor 200 through the slave-coupling filter 205. A slave channel white noise 213 having a slave channel white noise variance 210 of $\sigma_{WS}^2$ is added to the disturbance signal 118. For purposes of illustration, FIG. 2 shows the addition of the slave channel white noise 213 and the disturbance signal 118 as occurring at a slave summing circuit 215 to produce a slave-perturbation signal 220. However, in reality, the system receives the slave-perturbation signal 220 already having the disturbance signal 118 and the slave channel white noise 213 effects within the slave-perturbation signal 220. The slave-perturbation signal 220 is input to the slave feedforward filter 225, which recursively updates its filter characteristics. The slave feedforward filter 225 produces a filtered slave signal 230 using the received slave-perturbation signal 220. The filtered slave signal is then added to the master-composite signal 140 through a slave input adder 235. The slave input adder 235 is configured to subtract the filtered slave signal 230 from the master-composite signal 140 to produce a secondary sensor correction signal 240, which is fed back to the slave feedforward filter 225, thereby updating the characteristics of the slave feedforward filter 225. The secondary sensor correction signal 240 is also input to the master feedforward filter 145, and it is the secondary sensor correction signal 240 that propagates through the feedback circuit 195. Thus, as shown in FIG. 2, the input to the feedback circuit 195 is drastically altered by the introduction of the filtered slave signal 230 from the secondary sensor 200, and, as a consequence, the system characteristics are also drastically altered by the introduction of the filtered slave signal 230.

In the system of FIG. 2, which includes a strategically placed secondary sensor 200, the disturbance signal 118 spectral density term, which used to be $\sigma_{dist}^2 \tilde{\gamma}_M(v)$, becomes:

$$\frac{\sigma_{dist}^2 \tilde{\gamma}_M(v)}{1 + \left\{ (\sigma_{dist}^2 \tilde{\gamma}_M(v)) \left( \frac{|\tilde{s}_M(v)|^2}{\sigma_{WS}^2} \right) \right\}}, \quad [\text{Eq. 5}]$$

wherein:

$$\hat{k}_{s,M}(v) = \frac{\hat{g}_s(v)}{\hat{g}_M(v)}, \quad [\text{Eq. 6}]$$

$\sigma_{WS}^2$ represents the variance 210 of the slave channel white noise 213, and $\hat{g}_M(v)$ and $\hat{g}_s(v)$ represent the responses of the master coupling filter 115 and the slave-coupling filter 215, respectively.

As seen from Eqs. 4 and 5, the new spectral density term of Eq. 5 will always be less than or equal to the traditional spectral density term of Eq. 4, thereby resulting in an inequality such that:

$$\left( \frac{\sigma_{dist}^2 \ddot{Y}_M(v)}{1 + \left\{ (\sigma_{dist}^2 \ddot{Y}_M(v)) \left( \frac{|\hat{k}_{s,M}(v)|^2}{\sigma_{WS}^2} \right) \right\}} \right) \leq (\sigma_{dist}^2 \ddot{Y}_M(v)). \quad [\text{Eq. 7}]$$

Given that the added secondary sensor 200 alters the spectral density term according to Eqs. 5 and 7, the new SNR term, according to Eqs. 2 and 5, becomes:

$$SNR_{new}(v) = \frac{\sigma_{main}^2 |\hat{h}(v)|^2}{\sigma_{WM}^2 + \left( \frac{\sigma_{dist}^2 \ddot{Y}_M(v)}{1 + \left\{ (\sigma_{dist}^2 \ddot{Y}_M(v)) \left( \frac{|\hat{k}_{s,M}(v)|^2}{\sigma_{WS}^2} \right) \right\}} \right)}. \quad [\text{Eq. 8}]$$

Furthermore, now that the new SNR is defined according to Eq. 8, the new variance of the system having the additional secondary sensor 200 is now:

$$V_{new} = \sigma_{main}^2 \left( \exp \left\{ - \int_{[1]} \log(1 + SNR_{new}(v)) dv \right\} \right). \quad [\text{Eq. 9}]$$

Thus, from Eqs. 7, 8, and 9, it can be seen that for all frequencies:

$$SNR(v) \leq SNR_{new}(v) \quad [\text{Eq. 10}],$$

thereby allowing for a more effective denoising scheme. Additionally, if the master channel white noise 133 is relatively small compared to the disturbance signal 118 effect, then Eq. 9 may be approximated according to:

$$V_{new} \approx \sigma_{main}^2 \left( \exp \left\{ - \int_{[1]} \log(1 + SNR(v)) dv - \int_{[1]} \log \left( 1 + \left\{ (\sigma_{dist}^2 \ddot{Y}_M(v)) \left( \frac{|\hat{k}_{s,M}(v)|^2}{\sigma_{WS}^2} \right) \right\} \right) dv \right\} \right) \quad [\text{Eq. 11}]$$

Thus, according to Eqs. 1 and 11, the commensurate improvement in variance may be seen as:

$$\frac{V_{new}}{V} \approx \left( \exp \left\{ - \int_{[1]} \log(1 + \{(\sigma_{dist}^2 \ddot{Y}_M(v)) \left( \frac{|\hat{k}_{s,M}(v)|^2}{\sigma_{WS}^2} \right) \} \right) dv \right\} \right) \quad [\text{Eq. 12}]$$

As shown from the system of FIG. 2 and Eqs. 1 through 12, the strategic addition of a secondary sensor 200 may alter the transfer function of the system in such a way that the SNR is increased according to Eq. 8, which further translates to an improved variance according to Eq. 9, which may be approximated according to Eq. 11 when $\sigma_{WM}^2 << \sigma_{dist}^2$.

FIG. 3 is a block diagram showing another embodiment of the invention having a secondary sensor 300 configured to reduce the error variance of the system. Unlike the embodiment of FIG. 2, this embodiment is configured to include the main signal 108 on the secondary sensor 300. Thus, the system of FIG. 2 comprises a secondary sensor 300 that has its input coupled to the master channel input 105.

The system, therefore, may be seen as having two parallel segments that are coupled at the input, and a feedback circuit 395 that is configured to receive the output of the two parallel segments and update system characteristics of the two parallel segments. The first segment is referred to as a master segment, while the second segment is referred to as a secondary sensor 300.

The master segment comprises a master channel input 105, a master coupling filter 115 having a master coupling filter coefficient of $\hat{g}_M(v)$, a master-composite signal adder 340, and a master feedforward filter 145. A main signal 108 having a main signal variance 110 of $\sigma_{main}^2$ is received through the master channel input 105, while a disturbance signal 118 having a disturbance signal variance 120 of $\sigma_{dist}^2$ is received through the master coupling filter 115. Master channel white noise 130 having a master channel white noise variance 130 of $\sigma_{WM}^2$ is added to the disturbance signal 118. For purposes of illustration, FIG. 3 shows the addition of the master channel white noise 133 with the disturbance signal 118 as occurring at a master perturbation adder 330 to produce a master-perturbation signal 335. However, in reality, the system receives the master-perturbation signal 335 already having the master channel white noise 133 and the disturbance signal 118 effects within the master-perturbation signal 355. The master-perturbation signal 335 is added to the main signal 108 at the master-composite signal adder 340 to produce a master-composite signal 345. The produced master-composite signal 345 is input to the master feedforward filter 145, which produces a master filtered signal 360 from the master-composite signal 345.

The secondary sensor 300 comprises a slave-channel input 305, a slave-coupling filter 205 having a slave-coupling filter coefficient of $\hat{g}_s(v)$, a slave-composite signal adder 320, and a slave feedforward filter 350. The main signal 108 is received through the slave-channel input 305, while a disturbance signal 118 is received through the slave-coupling filter 205. Slave channel white noise 213 having a slave channel white noise variance 210 of $\sigma_{WS}^2$ is added to the disturbance signal 118. For purposes if illustration, FIG. 3 shows the addition of the slave channel white noise 213 and the disturbance signal 118 at the slave perturbation adder 315 to produce a slave-perturbation signal 318. However, in reality, the system receives the slave-perturbation signal 318 already having the slave channel white noise 213 and the disturbance signal 118 effects within the slave-perturbation signal 318. The slave-perturbation signal 318 is added to the main signal 108 at the slave-composite signal adder 320 to produce a slave-composite signal 325. The produced slave-composite signal 325 is input to the slave feedforward filter 350, which produces a filtered slave signal 355 from the slave-composite signal 325.

The feedback circuit 395 comprises the master feedforward filter 145 and the slave feedforward filter 350. Additionally, the feedback circuit 395 comprises a system composite signal adder 365, a feedback summing circuit 155, a memory-less decision device 165, a feedback filter 180, and an updating adder circuit 170. Once the master feedforward filter 145 and the slave feedforward filter 350 have produced the master filtered signal 360 and the filtered slave signal 355, respectively, these two signals 360, 355 are added together ad the system composite adder 365 to produce a system composite signal 370. The system composite signal 370 is input to the feedback summing circuit 155, which uses the system composite signal 370 to produce a feedback compensated signal 380. The feedback-compensated signal 380 is input to both the memory-less decision device 165 and the updating adder circuit 170. The memory-less decision device 165 receives the feedback-compensated signal 380 and produces a decision output 390. The decision output 390 is fed back to both the feedback filter 180 and the updating adder circuit 170. The feedback filter 180 receives the decision output 390 and produces a feedback signal 385 as a function of the decision output 390. This feedback signal 385 is subtracted from the system composite signal 370 by the feedback summing circuit 155. Thus, the feedback-compensated signal 380 is a function of both the feedback signal 385 and the system composite signal 370. The updating adder circuit 170 receives the decision output 390 and produces a correction signal 375 by subtracting from the decision output 390 the earlier received feedback-compensated signal 380. It is this correction signal 375 that is used to update the master feedforward filter 145 coefficient, the slave feedforward filter 350 coefficient, and the feedback filter 180 coefficient.

As shown in FIG. 3, the system characteristics are drastically altered by coupling a secondary sensor 300 to the input of the system, thereby having the main signal 108 on both the master segment and the secondary sensor 300.

In the system of FIG. 3, since the main signal 108 is present in both the master segment as well as the secondary sensor 300, the frequency gain of the system may be represented by a single vector $\tilde{h}(v)$, which takes into account the frequency gain of both the master segment and the secondary sensor 300. In other words, $\tilde{h}(v)$ represents both the master frequency gain and the slave frequency gain. Additionally, since there is a correlation between the perturbation in the master segment and the perturbation in the secondary sensor 300, a matrix $\tilde{R}(v)$ may be defined to represent the spectral covariance between the master perturbation and the slave perturbation. Stated differently, $\tilde{R}(v)$ represents the spectral covariance matrix of both the master-perturbation signal 335 and the slave-perturbation signal 220. Eq. 1 may now be re-written as:

$$V_{new} \approx \sigma_{main}^2 \left( \exp\left\{ -\int_{[1]} \log(1 + \sigma_{main}^2 \tilde{h}^T(v) \tilde{R}^{-1}(v)\tilde{h}(v))dv \right\} \right) \quad [\text{Eq. 13}]$$

to account for the contribution of the secondary sensor 300.

If the signal from the secondary sensor 300 is sufficiently small, then the variance of Eq. 13 may be approximated by:

$$V_{new} \approx \sigma_{main}^2 \left( \exp\left\{ -\int_{[1]} \log\left(1 + \frac{SNR(v)}{1 - \rho_{S,M}^2(v)}\right)dv \right\} \right), \quad [\text{Eq. 14}]$$

wherein:

$$\rho_{S,M}^2(v) = \frac{|\tilde{\gamma}_{S,M}(v)|^2}{\tilde{\gamma}_S(v)\tilde{\gamma}_M(v)}, \quad [\text{Eq. 15}]$$

$\tilde{\gamma}_M(v)$ represents the spectral density of the master-perturbation signal 335, $\tilde{\gamma}_S(v)$ represents the spectral density of the slave-perturbation signal 220, and $\tilde{\gamma}_{S,M}(v)$ represents the inter-spectral density between the slave-perturbation signal 220 and the master-perturbation signal 335.

According to the Schwartz inequality, $\tilde{\gamma}_S(v)\tilde{\gamma}_M(v)$ will never be greater than $\tilde{\gamma}_{S,M}(v)$. Hence, for all v:

$$\rho_{S,M}^2(v) \leq 1 \quad [\text{Eq. 16}].$$

Thus, from Eqs. 1, 14, and 16, if the signal from the secondary sensor 300 is sufficiently small, then:

$$V_{new} \leq V \quad [\text{Eq. 17}].$$

In addition to the systems described above, another embodiment of the invention may be seen as a method for reducing system error variance, thereby reducing signal corruption (or degradation).

Figure 4:
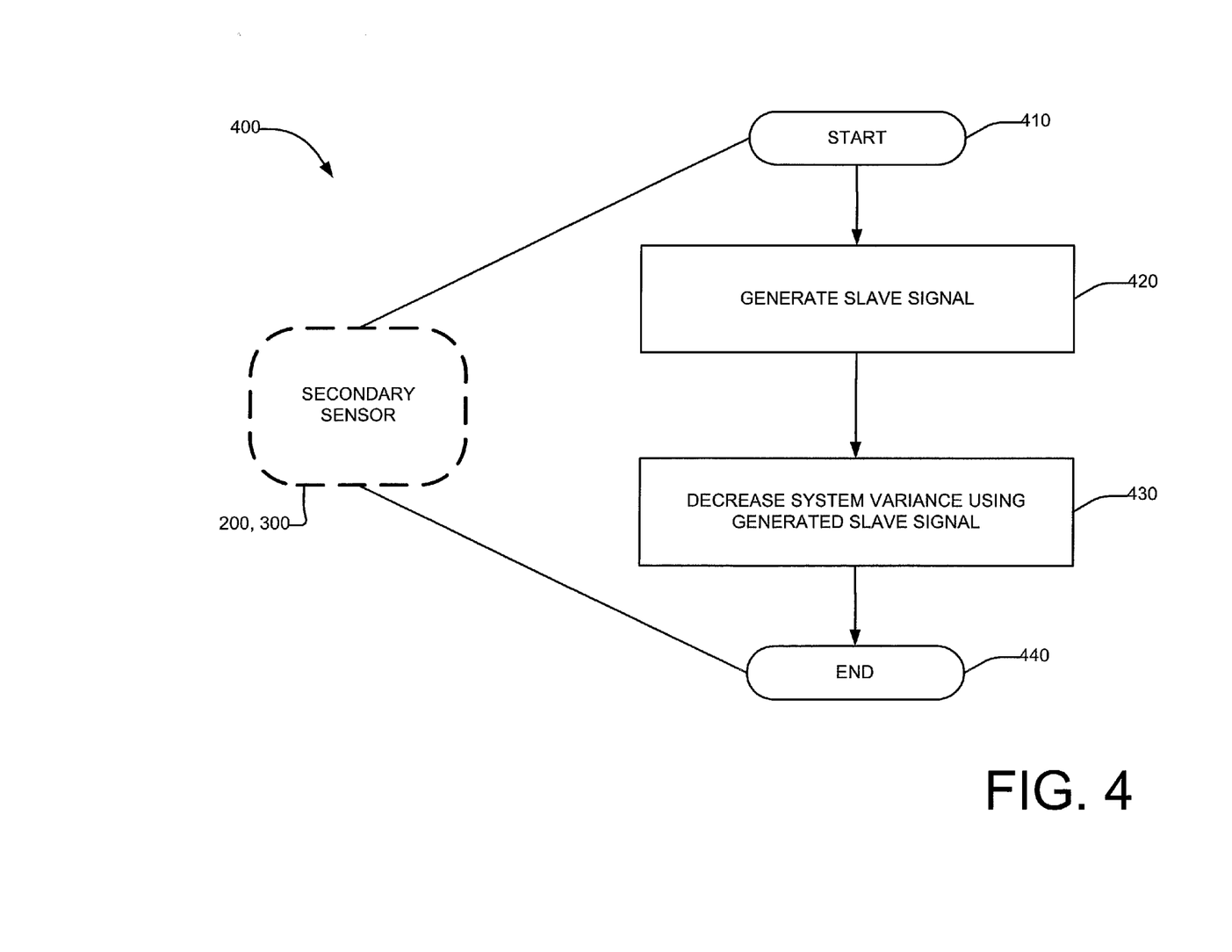
FIG. 4 is a flowchart showing one embodiment of a method of the invention.

FIG. 4 is a flowchart showing one embodiment of a method of the invention. In a broad sense, the method may be seen as a two-step process in which a slave signal is generated, in step 420, and a system variance is decreased, in step 430, using the generated 420 slave signal. In a preferred embodiment of the invention, the slave signal is generated using the secondary sensor 200 (FIG. 2), (300) FIG. 3, and is, therefore, the filtered slave signal 230 (FIG. 2), 355 (FIG. 3) that proceeds from the slave feedforward filter 225 (FIG. 2), 350 (FIG. 3).

Figure 5:
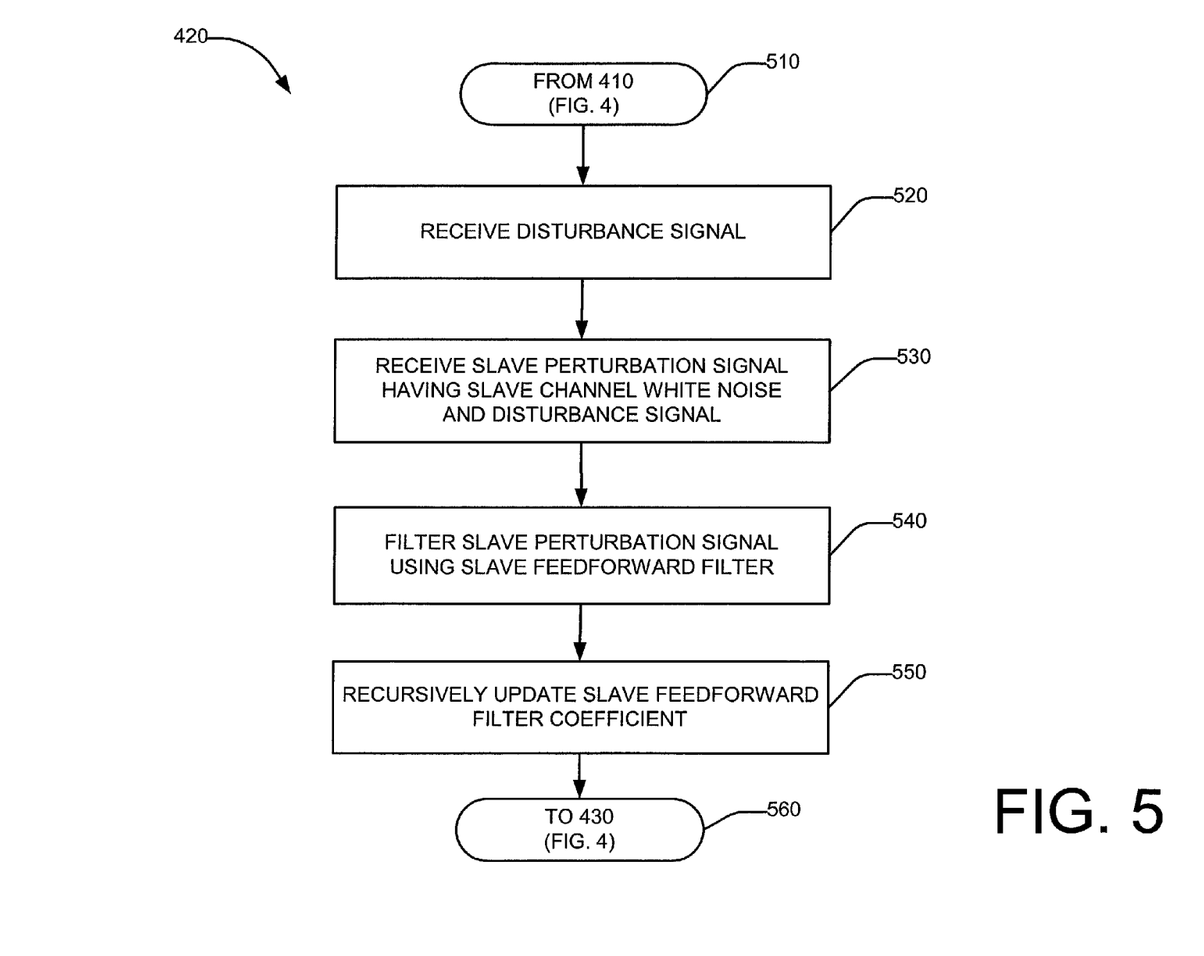
FIG. 5 is a flowchart showing, in greater detail, one embodiment of the step of generating a slave signal from FIG. 4.

FIG. 5 is a flowchart showing, in greater detail, one embodiment of the step of generating 420 the slave signal from FIG. 4. In this embodiment of the generating step 420, the slave signal is devoid of any main signal effects. Thus, the generation 420 of the slave signal, as shown in FIG. 5, begins with the receiving, in step 520, of the disturbance signal 118 (FIG. 2). In addition to the received 520 disturbance signal 118 (FIG. 2), a slave-perturbation signal 220 (FIG. 2) is received. The slave-perturbation signal 220 (FIG. 2) has slave channel white noise 213 (FIG. 2) and the disturbance signal 118 (FIG. 2). The slave-perturbation signal 220 (FIG. 2) is then filtered, in step 540, by the slave feedforward filter 225 (FIG. 2) to produce the filtered slave signal 230 (FIG. 2). The slave feedforward filter 225 (FIG. 2) is recursively updated, in step 550, so that an optimum filtered slave signal 230 (FIG. 2) is produced. As seen here, the slave signal is a composite signal that includes disturbance and noise effects, but no main signal effects.

Figure 6:
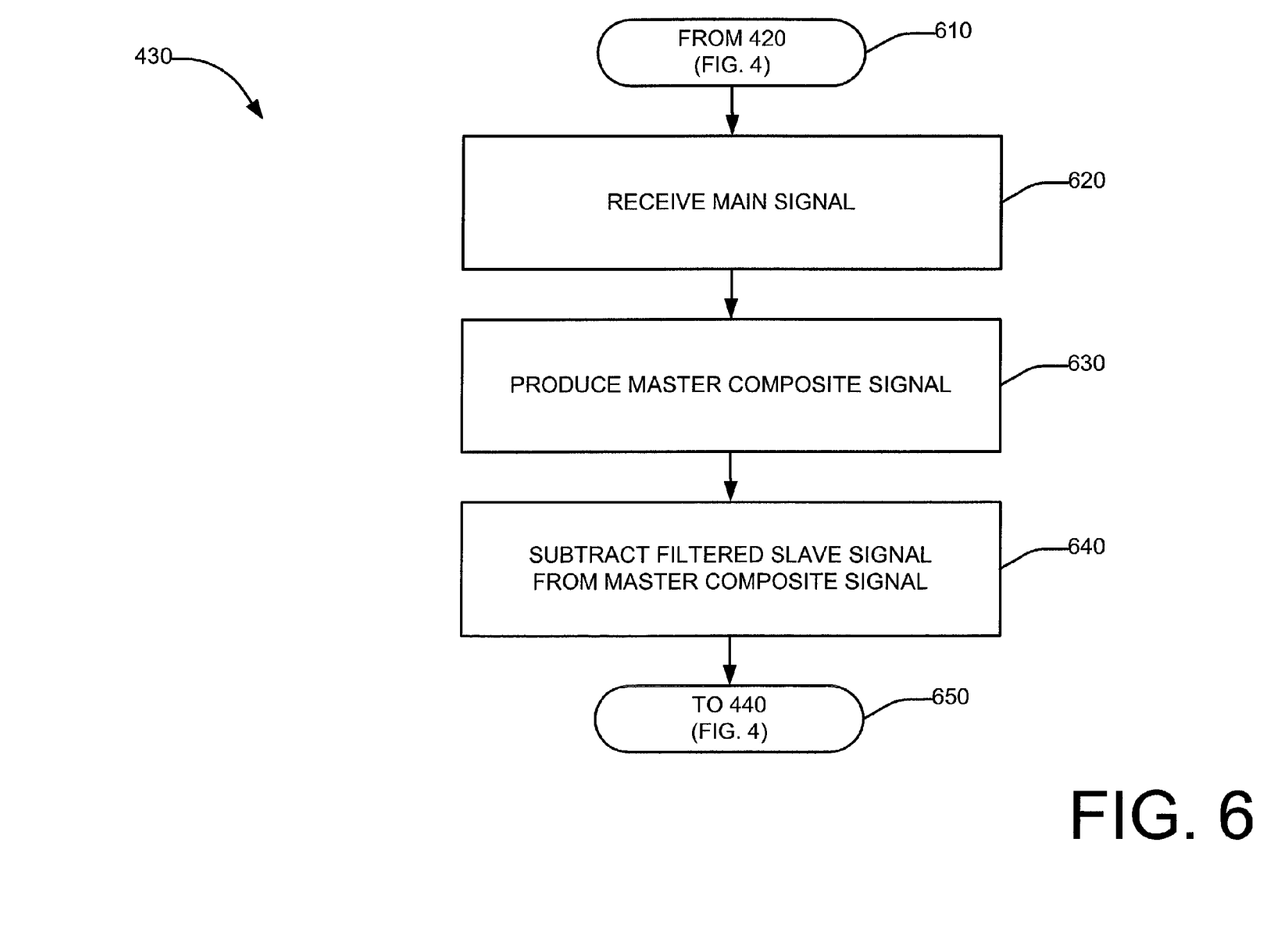
FIG. 6 is a flowchart showing, in greater detail, one embodiment of the step of decreasing system variance from FIG. 4.

FIG. 6 is a flowchart showing, in greater detail, one embodiment of the step of decreasing 430 system variance from FIG. 4. Here, the process begins with the receiving, in step 620, of the main signal 108 (FIGS. 2 and 3). The received main signal is used to produce, in step 630, a master-composite signal. The filtered 540 (FIG. 5) slave signal is subtracted, in step 640, from the produced 630 master-composite signal. The signal subtraction 640 alters system response characteristics, thereby altering the system variance.

Figure 7:
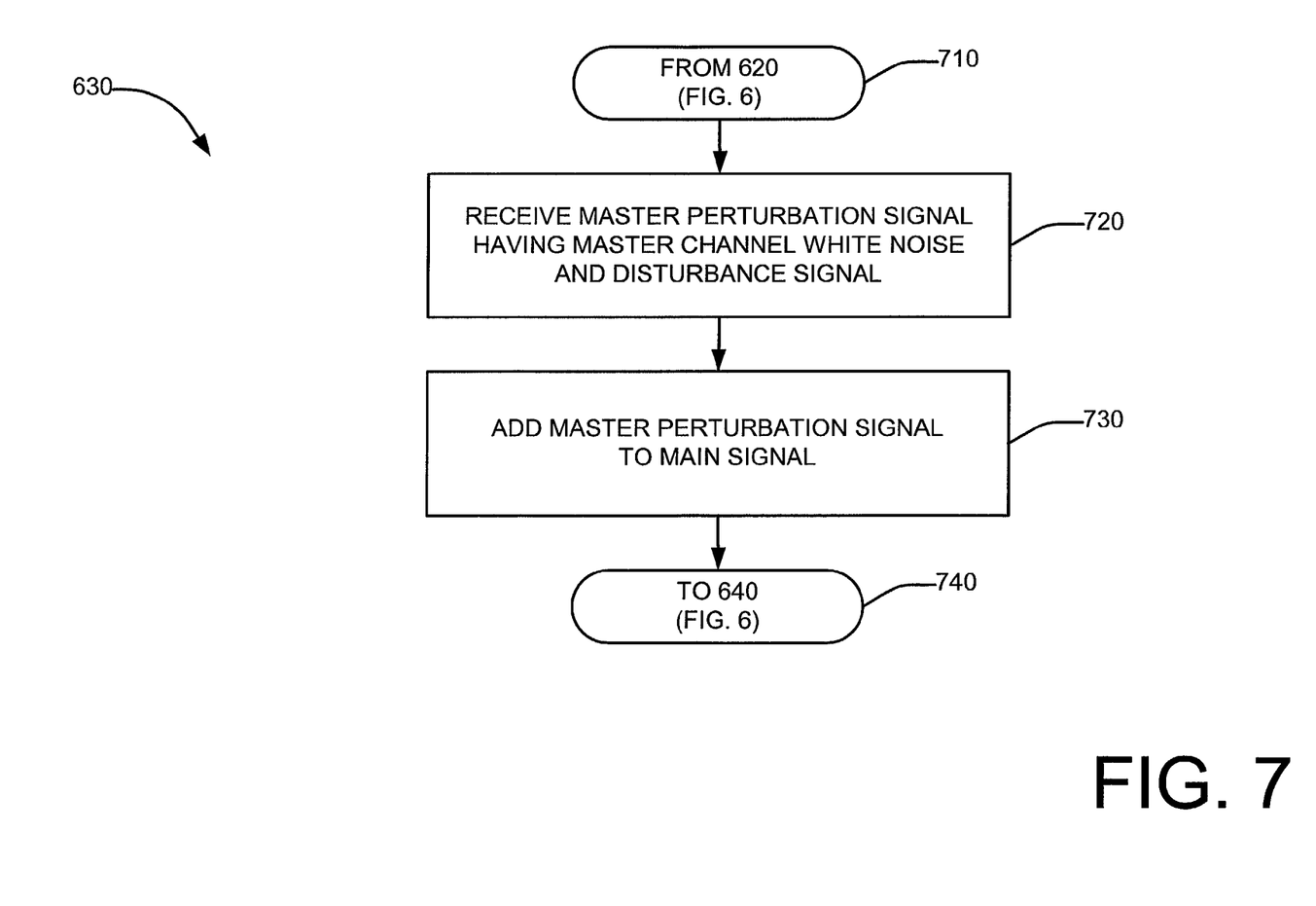
FIG. 7 is a flowchart showing, in greater detail, one embodiment of the step of generating a master-composite signal from FIG. 6.

FIG. 7 is a flowchart showing, in greater detail, one embodiment of the step of producing 630 a master-composite signal from FIG. 6. The master-composite signal is produced by receiving, in step 720, a master-perturbation signal having master channel white noise 133 (FIGS. 2 and 3) and the disturbance signal 118 (FIGS. 2 and 3). The master-perturbation signal is added, in step 730, to the main signal 108 (FIGS. 2 and 3), thereby producing the master-composite signal. In other words, the master-composite signal is the main signal 108 (FIGS. 2 and 3) that has been corrupted by a disturbance signal 118 (FIGS. 2 and 3) and master channel white noise 133 (FIGS. 2 and 3).

Figure 8:
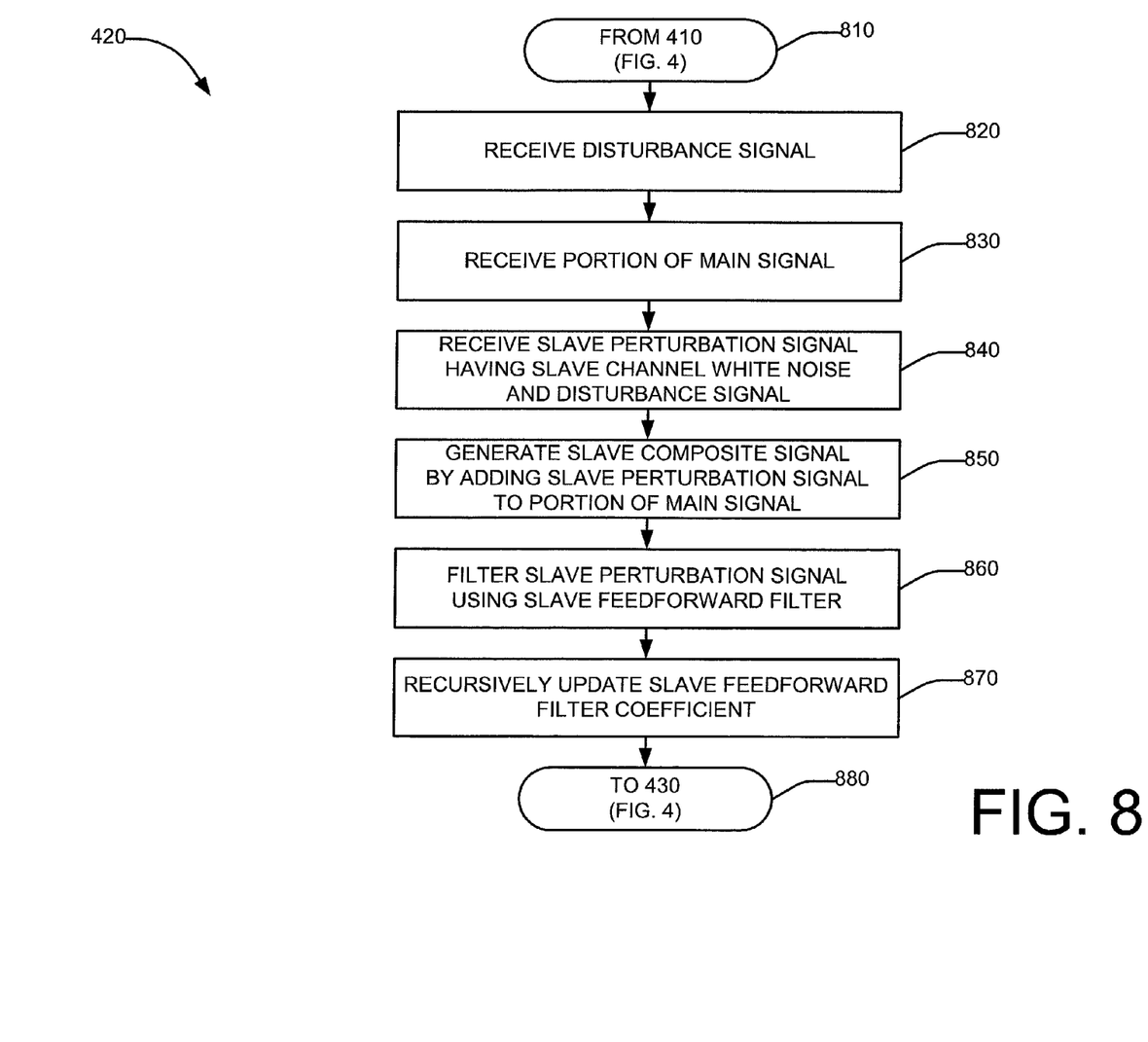
FIG. 8 is a flowchart showing another embodiment of the step of generating a slave signal from FIG. 4.

FIG. 8 is a flowchart showing another embodiment of the step of generating a slave signal from FIG. 4. In this embodiment, the slave signal is affected by the main signal 108 (FIG. 3). Thus, the generation 420 of the slave signal, as shown in FIG. 8, begins with the receiving, in step 820, of the disturbance signal 118 (FIG. 3) and the step of receiving, in step 830, a portion of the main signal 108 (FIG. 3). A slave-perturbation signal 318 (FIG. 3) having slave channel white noise 213 (FIG. 3) and the disturbance signal 118 (FIG. 3) is then received in step 840. Once the slave-perturbation signal 318 (FIG. 3) has been received 840, the system then generates, in step 850, a slave-composite signal 325 (FIG. 3) by adding the slave-perturbation signal 318 (FIG. 3) to the received 830 portion of the main signal 108 (FIG. 3). The slave-composite signal 325 (FIG. 3) is filtered, in step 860, by the slave feedforward filter 350 (FIG. 3) to produce the filtered slave signal 355 (FIG. 3), which is subsequently used to decrease 430 (FIG. 4) system variance. The slave feedforward filter 350 (FIG. 3) is recursively updated, in step 870, so that an optimum filtered slave signal 355 (FIG. 3) is produced. As seen here, the slave signal is a composite signal that includes main signal effects in addition to disturbance and noise effects. Once the slave signal has been generated in accordance with the steps of FIG. 8, the variance of the system may be decreased by following the steps shown in FIGS. 6 and 7.

Although an exemplary embodiment of the present invention has been shown and described, it will be apparent to those of ordinary skill in the art that a number of changes, modifications, or alterations to the invention as described may be made, none of which depart from the spirit of the present invention. For example, while the secondary sensor 200 (FIG. 2), 300 (FIG. 3) is shown to modify a classical minimum-means-square error (MMSE) decision feedback equalizer (DFE), it will be clear to one of ordinary skill in the art that any receiver system may be improved by the strategic placement of a secondary sensor 200 (FIG. 2), 300 (FIG. 3). Thus, as long as the receiver system may be characterized by a system error variance, a secondary sensor 200 (FIG. 2), 300 (FIG. 3) may be used in conjunction with the receiver system to reduce the system error variance, thereby reducing signal corruption. Additionally, while the method steps in FIGS. 4 through 8 are shown as being performed by the specific system of FIGS. 2 and 3, the method steps may be performed by any communications system in which a secondary sensor is strategically placed to alter system characteristics. Also, while the flowcharts depict the method steps as sequential steps, it will be clear to one of ordinary skill in the art that several of these steps may be taken out of order, or may be performed substantially simultaneously without adverse effect to the invention. For example, in FIG. 8, the step of receiving the disturbance signal (step 820) and the step of receiving a portion of the main signal (step 830) may be taken out of order or performed substantially simultaneously.

All such changes, modifications, and alterations should therefore be seen as within the scope of the present invention.

We claim:

1. A system for reducing signal corruption in a communications system, comprising:

a receiver having a frequency gain of $\tilde{h}(\nu)$ at a normalized frequency of $\nu$, wherein the receiver is configured to receive a main signal having a variance $\sigma_{main}^2$, wherein the receiver is further configured to receive a master-perturbation signal through a master coupling filter, wherein the master coupling filter has a filter coefficient of $\tilde{g}_M(\nu)$, wherein the master-perturbation signal is characterized by a master channel white noise variance $\sigma_{WM}^2$ and a disturbance signal spectral density $\sigma_{dist}^2 \tilde{\gamma}_M(\nu)$, wherein the receiver has a signal-to-noise ratio (SNR) of:

$$SNR(\nu) = \frac{\sigma_{main}^2 |\tilde{h}(\nu)|^2}{\sigma_{WM}^2 + \sigma_{dist}^2 \tilde{\gamma}_M(\nu)};$$

and a secondary sensor coupled to the receiver, wherein the secondary sensor is configured to receive a slave-perturbation signal through a slave-coupling filter having a filter coefficient of $\tilde{g}_S(\nu)$, wherein the slave-perturbation signal is characterized by a slave channel white noise variance of $\sigma_{WS}^2$ and a disturbance signal variance $\sigma_{dist}^2$, wherein the secondary sensor is configured to decrease the disturbance spectral density from $\sigma_{dist}^2 \tilde{\gamma}_M(\nu)$ to $$\frac{\sigma_{dist}^2 \tilde{\gamma}_M(\nu)}{1 + \left\{ (\sigma_{dist}^2 \tilde{\gamma}_M(\nu)) \left( \frac{\left| \frac{\tilde{g}_S}{\tilde{g}_M}(\nu) \right|^2}{\sigma_{WS}^2} \right) \right\}}.$$

2. A system for reducing signal corruption in a communications system, comprising:

a receiver having a master frequency gain, wherein the receiver is configured to receive a main signal, wherein the main signal has a variance $\sigma_{main}^2$, wherein the receiver is further configured to receive a master-perturbation signal, wherein the receiver has an error variance:

$$V = \sigma_{main}^2 \left( \exp\left\{ \int_{[1]} \log(1 + SNR(v))dv \right\} \right),$$

wherein V represents the error variance, v represents a normalized frequency, and SNR(v) represents a signal-to-noise ratio (SNR) of the receiver at the normalized frequency; and a secondary sensor having a slave frequency gain, wherein the secondary sensor is coupled to the receiver, wherein the secondary sensor is configured to receive a portion of the main signal, wherein the secondary sensor is further configured to receive a slave-perturbation signal, wherein the secondary sensor is further configured to alter the error variance from $$V = \sigma_{main}^2 \left( \exp\left\{ -\int_{[1]} \log(1 + SNR(v))dv \right\} \right) \text{ to}$$

$$V_{new} = \sigma_{main}^2 \left( \exp\left\{ -\int_{[1]} \log(1 + \sigma_{main}^2 \tilde{\mathbf{h}}^T(v)\tilde{\mathbf{R}}^{-1}(v)\tilde{\mathbf{h}}(v))dv \right\} \right),$$

wherein $V_{new}$ represents the altered error variance due to the secondary sensor, $\tilde{\mathbf{h}}(v)$ represents a vector characterization of both the master frequency gain and the slave frequency gain and $\tilde{\mathbf{h}}^T(v)$ represents a corresponding transposed vector, $\tilde{\mathbf{R}}(v)$ represents a spectral covariance matrix of both the master-perturbation signal and the slave-perturbation signal.

3. A method for reducing signal corruption in a communications system, comprising the steps of:
generating a filtered slave signal;
decreasing a system variance using the filtered slave signal; and
recursively updating the slave feedforward filter coefficient;
wherein the step of generating the filtered slave signal comprises the steps of:
receiving a disturbance signal;
receiving a slave-perturbation signal having slave channel white noise and the disturbance signal; and
filtering the slave-perturbation signal using a slave feedforward filter to produce the filtered slave signal; and
wherein the step of decreasing the system variance comprises the steps of:
receiving a main signal;
producing a master-composite signal from the main signal by adding a master-perturbation signal to the main signal, wherein the master-perturbation signal is the disturbance signal in the presence of master channel white noise; and
subtracting the filtered slave signal from the master-composite signals.

4. The method of claim 3, wherein the step of generating the filtered slave signal comprises the steps of:
receiving a disturbance signal and a portion of a main signal;
receiving a slave-perturbation signal having slave channel white noise and the disturbance signal;
generating a slave-composite signal by adding the slave-perturbation signal to the portion of the main signal; and
filtering the slave-composite signal using a slave feedforward filter to produce the filtered slave signal.

5. The method of claim 4, further comprising the step of recursively updating the slave feedforward filter coefficient.

6. The method of claim 5, wherein the step of decreasing the system variance comprises the steps of:
receiving a main signal;
producing a master-composite signal from the main signal by adding a master-perturbation signal to the main signal, wherein the master-perturbation signal is the disturbance signal in the presence of master channel white noise; and
subtracting the filtered slave signal from the master-composite signal.

7. A system for reducing signal corruption in a communications system, comprising:
means for generating a filtered slave signal;
means for decreasing a system variance using the filtered slave signal; and
means for recursively updating the slave feedforward filter coefficient;
wherein the means for generating the filtered slave signal comprises:
means for receiving a disturbance signal;
means for receiving a slave-perturbation signal having slave channel white noise and the disturbance signal; and
means for filtering the slave-perturbation signal using a slave feedforward filter to produce the filtered slave signal; and
wherein the means for decreasing the system variance comprises:
means for receiving a main signal;
means for producing a master-composite signal from the main signal by adding a master-perturbation signal to the main signal, wherein the master-perturbation signal is the disturbance signal in the presence of master channel white noise; and
means for subtracting the filtered slave signal from the master-composite signals.

8. The system of claim 7, further comprising means for recursively updating the slave feedforward filter coefficient.

9. The system of claim 8, wherein the means for decreasing the system variance comprises:
means for receiving a main signal;
means for producing a master-composite signal from the main signal by adding a master-perturbation signal to the main signal, wherein the master-perturbation signal is the disturbance signal in the presence of master channel white noise; and
means for subtracting the filtered slave signal from the master-composite signal.

* * * * *